(12) United States Patent
Haffmans et al.

(10) Patent No.: US 8,820,922 B2
(45) Date of Patent: Sep. 2, 2014

(54) EYEGLASS JOINT AND EYEGLASS FRAME

(75) Inventors: Daniel Haffmans, Berlin (DE); Phillipp Haffmans, Berlin (DE); Harald Gottschling, Berlin (DE); Moritz Krueger, Berlin (DE); Martin Guentert, Berlin (DE)

(73) Assignee: Mykita Studio GmbH, Berlin (DE)

( * ) Notice: Subject to any disclaimer, the term of this patent is extended or adjusted under 35 U.S.C. 154(b) by 200 days.

(21) Appl. No.: 13/496,721

(22) PCT Filed: Sep. 15, 2010

(86) PCT No.: PCT/EP2010/063570
§ 371 (c)(1),
(2), (4) Date: Aug. 2, 2012

(87) PCT Pub. No.: WO2011/032995
PCT Pub. Date: Mar. 24, 2011

(65) Prior Publication Data
US 2012/0307197 A1    Dec. 6, 2012

(30) Foreign Application Priority Data

Sep. 16, 2009 (DE) .......................... 10 2009 029 491

(51) Int. Cl.
*G02C 5/22* (2006.01)
(52) U.S. Cl.
CPC ............... *G02C 5/2254* (2013.01); *G02C 5/22* (2013.01)
USPC ............................. 351/153; 16/228; D16/334

(58) Field of Classification Search
USPC ............. 351/121, 153; 16/228; D16/300, 334
See application file for complete search history.

(56) References Cited

U.S. PATENT DOCUMENTS 1,599,843 A * 9/1926 Schumacher ................... 16/228

FOREIGN PATENT DOCUMENTS

| DE | 88 12 332 U1 | 11/1988 |
| DE | 38 37 180 A1 | 5/1990 |
| EP | 0 455 999 A1 | 11/1991 |
| WO | 2008/034440 A1 | 3/2008 |

* cited by examiner

*Primary Examiner* — Darryl J Collins
(74) *Attorney, Agent, or Firm* — Kriegsman & Kriegsman (57) ABSTRACT

The invention relates to an eyeglass hinge, composed of two hinge parts and at least one clamp connection. Further, the invention relates to an eyeglass frame, composed of two eyeglass hinges according to the invention, two eyeglass earpieces and one lens mounting rim. The eyeglass hinge (1) according to the invention comprises two hinge parts (2, 2a) and at least one clamp connection (3), whereby the at least one clamp connection (3) holds hinge parts (2, 2a) together in an articulated manner. When force is increased, the construction of the eyeglass hinge according to the invention makes possible a problem-free exceeding of frame opening angle $\alpha$ from a value of $\alpha_{open}$ which amounts to approximately 180° up to a value of $\alpha_{max}$ of approximately 186° (over-bending) and going below frame opening angle $\alpha$ from a value of $\alpha_{closed}$, which amounts to approximately 90°, down to a value of $\alpha_{min}$ of approximately 85° (under-bending).

15 Claims, 11 Drawing Sheets

EYEGLASS JOINT AND EYEGLASS FRAME

The invention relates to an eyeglass hinge, composed of two hinge parts and at least one clamp connection. Further, the invention relates to an eyeglass frame composed of two eyeglass hinges according to the invention, two eyeglass earpieces and one lens mounting rim.

In most eyeglass frames, the eyeglass earpiece is bent at an angle by an eyeglass hinge. The eyeglass hinge is frequently formed in the shape of a hinge whose components can be held together by a screw. In many cases, these hinges possess a stop piece, which limits the frame opening angle $\alpha$ that the hinge parts form relative to one another. This stop piece prevents the frame opening angle $\alpha$ from exceeding a value of approximately 180°. Such a construction, however, has the disadvantage that when the frame opening angle is exceeded, i.e., there is a further opening of the earpiece, this can lead to the circumstance that the eyeglass frame is bent out of shape or even broken. Another disadvantage of eyeglass hinges of the prior art is that the screw used in the hinge can loosen over time and must be tightened.

An object of the invention is thus to provide an eyeglass hinge that overcomes the disadvantages of the prior art. In addition, an object of the present invention is to provide an eyeglass frame that comprises the eyeglass hinges according to the invention.

An object of the present invention is achieved by an eyeglass hinge that is composed of two hinge parts and at least one clamp connection that holds the hinge parts together in an articulated manner.

The object of the invention is thus achieved by providing an eyeglass hinge according to the principal claim. Advantageous embodiments of the eyeglass hinge according to the invention are characterized in the dependent subclaims.

The eyeglass hinge 1 according to the invention is composed of two hinge parts 2, 2a and at least one clamp connection 3, whereby the at least one clamp connection 3 holds hinge parts 2, 2a together in an articulated manner.

It is preferred according to the invention that one of hinge parts 2 has a curvature 4 and the other hinge part 2a has a dome-shaped cap 5, the curvature 4 of the one hinge part 2 being disposed in the dome-shaped cap 5 of the other hinge part 2a.

According to the invention, it is further preferred that each hinge part 2, 2a has at least one recess 10, in which the at least one clamp connection 3 can be fixed.

It is also preferred according to the invention that clamp connection 3 is a bent, elongated strip of material, whose ends 9 are bent pointing toward one another.

It is also preferred according to the invention that each of the bent ends 9 of clamp connection 3 is inserted in one of recesses 10 of hinge parts 2, 2a.

It is particularly preferred according to the invention that when the frame opening angle $\alpha$ changes, eyeglass hinge 1 independently either
jumps from a position with an open frame opening angle $\alpha_{open}$ to a position with a closed frame opening angle $\alpha_{closed}$
or
jumps from a position with a closed frame opening angle $\alpha_{closed}$ to a position with an open frame opening angle $\alpha_{open}$.

It is most particularly preferred that the open frame opening angle $\alpha_{open}$ corresponds to an angle of approximately 180° and the closed frame opening angle $\alpha_{closed}$ corresponds to an angle of approximately 90°.

It is particularly preferred according to the invention that at least one of the two hinge parts 2, 2a has a stop piece 8, which limits the frame opening angle when eyeglass hinge 1 is bent at an angle.

It is further preferred according to the invention that frame opening angle $\alpha_{open}$ can assume a value of approximately 180° up to approximately 186° without problem and that frame opening angle $\alpha_{closed}$ can assume a value of approximately 90° down to approximately 85° without problem.

An eyeglass hinge 1 according to the invention is also preferred, wherein hinge part 2a has at least one block-like raised material piece 15 and hinge part 2 has a rail 16 that is shaped and dimensioned so that it can receive the at least one block-like raised material piece 15.

It is further preferred according to the invention that hinge parts 2, 2a have devices 6 for fastening to an earpiece or to a lens mounting rim.

In this case, it is particularly preferred that hinge parts 2, 2a have at least one pin 7, at least one anchor piece and/or at least one textured adhesive surface, which can be fixed in an earpiece or a lens mounting rim.

An eyeglass hinge 1 is further preferred according to the invention, wherein one end of one of the two hinge parts 2, 2a has an extension in the shape of an earpiece and/or the free end of the other hinge part 2, 2a has an extension in the shape of a lens mounting rim.

The subject of the invention is also an eyeglass frame composed of two eyeglass hinges 1 according to the invention, two eyeglass earpieces and one lens mounting rim, wherein each eyeglass hinge 1 is joined to the lens mounting rim on one side of the hinge and each is joined to an earpiece on the other side of the hinge.

The subject of the invention is also an eyeglass frame that comprises at least one eyeglass hinge 1 according to the invention.

Another subject of the present invention is the use of an eyeglass hinge 1 according to the invention for producing an eyeglass frame.

When force is increased, the construction of the eyeglass hinge according to the invention makes possible a problem-free exceeding of frame opening angle $\alpha$ from a value of $\alpha_{open}$ which amounts to approximately 180° up to a value of $\alpha_{max}$ of approximately 186° (over-bending) and going below frame opening angle $\alpha$ from a value of $\alpha_{closed}$, which amounts to approximately 90°, down to a value of $\alpha_{min}$ of approximately 85° (under-bending). $\alpha_{min}$ is limited in most cases by the lens mounting rim. If this is not the case, the side of the clamp facing the wearer's head can also serve as a stop piece, however, and can prevent an excessive an under-bending.

When force is increased, in addition, a problem-free deflection of the eyeglass hinge according to the invention, which is perpendicular to the hinge axis (out from the plane formed by the hinge parts) is also possible. Here, the deflection from the plane can produce an angle $\alpha_{top}$ of approximately 4° or $\alpha_{bottom}$ also of approximately 4°. This movement is only possible due to the absence of a hinge axis. In the present case, hinge axis is understood to be an axis that is formed by a screw, a shaft or a similar element.

The movement in the direction of $\alpha_{top}$ or $\alpha_{bottom}$ can be limited by the width of the clamp. In this case, the clamp thus tilts inside the hinge.

In addition, in the case of the hinge according to the invention, a deflection may occur in the form of torsion in the axis of the earpiece. The more the shape of the two running surfaces of the hinge approximates the shape of a sphere, the more readily such torsion occurs. It this type of rotational movement is not desired, arcuate rails in the region of the running surface can prevent this movement.

The extent of problem-free movements in three-dimensional space, thus the play of the hinge according to the invention is primarily defined by the geometry and the material of the clamp connection.

An over-extension of the eyeglass hinge, thus an increase in frame opening angle $\alpha_{open}$ to above a value of approximately 180° up to a value of $\alpha_{max}$, an under-extension of the eyeglass hinge, thus a decrease in the frame opening angle $\alpha_{closed}$ to less than a value of 90° down to $\alpha_{min}$, and a deflection of the eyeglass hinge perpendicular to the hinge axis (out from the plane formed by the hinge parts) to values of $\alpha_{top}$ or $\alpha_{bottom}$ are attenuated by the eyeglass hinge according to the invention. Likewise, slight impacts, such as can occur in everyday life, against the hinge or against an eyeglass frame in which the hinge is integrated, do not lead to a bending out of shape or breaking of the eyeglass hinge or the eyeglass frame.

In addition, when compared with eyeglass hinges of the prior art, it is advantageous that the use of screws, axial pins or other fastening means that are normally common in eyeglass hinges can be omitted. The only part that is to be viewed as a part subject to wear is the clamp connection. This is easily replaced.

The eyeglass hinge according to the invention is an advantageous combination of a ball joint and a hinge joint.

One of the hinge parts 2, 2a, i.e., hinge part 2 preferably has a curvature 4 and the other hinge part 2a has a dome-shaped cap 5, the curvature 4 of one hinge part 2 being disposed in the dome-shaped cap 5 of the other hinge part 2a.

The hinge part 2 having the curvature 4 forms a hinge head and the hinge part 2a having the dome-shaped cap 5 form a hinge socket. Thus an articulated connection between hinge head and hinge socket will be formed and maintained if these are connected to at least one clamp connection 3. The function of clamp connection 3 can be compared to the anatomical function of tendons and ligaments. The at least one clamp connection 3 in this case engages around the unit formed by hinge head and hinge socket.

Each of the hinge parts preferably has at least one recess in which the at least one clamp connection can be fixed. In this case, the recess can be a simple hole or a projection in or on the hinge part, whereby the recess is formed so that the at least one clamp connection can be fixed thereto.

The at least one clamp connection in this case is preferably fixed by hooks, by one-sided adhering and hooking, by one-sided soldering and hooking or similar methods.

The at least one clamp connection is preferably a bent, elongated material strip, whose ends are bent pointing toward one another. The clamp connection is made of a flexible material, such as metal or plastic, for example.

Each of the bent ends of the at least one clamp connection preferably engages in one of the recesses of the hinge parts. A shoulder can be disposed at the edge of the recess, which serves for a better fastening of the clamp connection. Such a shoulder is obtained by reducing the thickness of the material or an aperture.

In a preferred embodiment of the invention, when there is a change in the frame opening angle $\alpha$, the eyeglass hinge independently jumps from a position with an open frame opening angle $\alpha_{open}$ into a position with a closed frame opening angle $\alpha_{closed}$, or from a position with a closed frame opening angle $\alpha_{closed}$ into a position with an open frame opening angle $\alpha_{open}$.

By means of the tension of the clamp connection, two frame opening angles $\alpha$, namely $\alpha_{open}$ and $\alpha_{closed}$ are defined, in which the hinge parts revert to the open or closed state independently.

The open frame opening angle $\alpha_{open}$ preferably corresponds to an angle of 180° and the closed frame opening angle $\alpha_{closed}$ corresponds to an angle of approximately 90°.

One of the two hinge parts or both of these preferably has or have a stop piece that limits the frame opening angle $\alpha$ and establishes $\alpha_{open}$ and $\alpha_{closed}$. Thus, when an eyeglass hinge according to the invention is used in an eyeglass frame, the angle that is formed between earpiece and lens mounting rim when opening or closing the eyeglasses is also established. The frame opening angle $\alpha_{open}$ of the eyeglass hinge of approximately 180° corresponds to an angle between earpiece and lens mounting rim of approximately 90°. The frame opening angle $\alpha_{closed}$ of the eyeglass hinge of approximately 90° corresponds to an angle between earpiece and lens mounting rim of approximately 180°.

When the eyeglass hinge is over-extended due to the formation of an angle between earpiece and eyeglass frame of more than 90°, the frame opening angle $\alpha_{open}$ of the eyeglass hinge is limited to the maximum value $\alpha_{max}$ by the clamp connection. Only if this angle is exceeded is there a bending out of shape of the hinge or of the eyeglass frame, respectively. The clamp connection is thus not rigid, but rather makes possible an over-extension of the frame opening angle $\alpha_{open}$ to an angle that is larger than 180° ($\alpha_{max}$).

In order to prevent or attenuate a rotational movement of the earpiece around the earpiece axis in the open state or a pivoting moment of the earpiece in the up and down directions around the hinge central point at the front mask in the closed state, the hinge socket may have one or more positively shaped blocks that run in a corresponding rail in the counterpart piece. The normal folding movement of the hinge is not influenced by this. Only a rotation of the hinge parts relative to one another is prevented or made difficult with the rail formation. It limits the mobility of the hinge in all directions, but also counteracts an improper treatment, if necessary.

Thus the eyeglass hinge according to the invention can be used in an eyeglass frame; each of the two hinge parts preferably possesses a device for fastening the hinge part to an eyeglass earpiece or a lens mounting rim. This device is formed either in the shape of an inlay (an inlay), by means of which a part of the eyeglass hinge is inserted into an earpiece or the lens mounting rim and is fixed therein, or it forms a cavity, in which a part of the earpiece or the lens mounting rim is inserted.

Advantageously, the eyeglass hinge is joined to an earpiece and the lens mounting rim is joined by adhering or bonding (flooding).

In addition, the device for fastening the hinge parts may have structures or roughened surfaces that reinforce the connection between eyeglass hinge and earpiece or lens mounting rim.

Additional means for fastening the hinge parts preferably comprise at least one pin, which can be fixed in an earpiece or a lens mounting rim. Such an embodiment has the advantage that the at least one pin can be forced into the earpiece or a part of the lens mounting rim and thus a stable connection of the components will be achieved. The at least one pin can additionally be roughened or have a profile, by means of which the joining of the components is additionally reinforced.

In the previously described embodiments, the eyeglass hinge according to the invention is joined with an earpiece and a lens mounting rim. The eyeglass hinge according to the invention, however, can also be designed in such a way that the earpiece or the lens mounting rim is part of the eyeglass hinge.

Thus, in a preferred embodiment of the invention, one end of one of the two hinge parts of the eyeglass hinge according to the invention has an extension in the shape of an earpiece. Alternatively or additionally, the free end of the other hinge part may have an extension in the form of a lens mounting rim.

The hinge parts of the eyeglass hinge according to the invention can be produced by methods such as stamping, metal powder injection molding, zinc die-casting or sheet-metal forming.

In particular, metal powder injection molding, also called the MIM method (MIM: Metal Injection Molding), is a suitable method for producing hinge parts. Production by means of metal powder injection molding essentially is carried out in four steps:
1. Producing the base material, the so-called feedstock, by mixing fine metal powder, thermoplastics, and a plasticizing granulate.
2. The shaping is carried out by means of conventional injection molding machines. A so-called green compact is formed. The green compact is approximately 20% larger than the desired product, but already has all of the geometric properties of the manufactured final product.
3. The binder components are removed by extraction, catalysis or pyrolysis, depending on the material used.
4. The porous molded bodies obtained by the method are called brown compacts. They are sintered under vacuum or protective gas and in this manner they reach their final geometry.

Suitable metals for producing the hinge parts are primarily stainless, non-allergenic (nickel-free) steels with a high degree of hardness. Titanium alloys and magnesium alloys are also mechanically suitable, but are more expensive.

In further steps, the hinge parts are cleaned and degreased. Subsequently, the surface of the hinge parts can be vibratory ground, polished, provided with a lacquer coating, blackened or further treated by applying additional layers, for example, by electroplating or PVD (physical vapor deposition) coating, depending on the desired application or for esthetic reasons in each case.

The hinge parts produced by the metal powder injection molding method, however, may also be assembled with at least one clamp connection into the eyeglass hinge according to the invention without further treatment.

Producing the hinge parts from plastic in the injection molding method is also preferred.

Plastics such as polyamide, polyethylene, polytetrafluoroethylene, polyethylene terephthalate and other tough plastics with good sliding properties, optionally with a partial metal reinforcement in the support regions of the clamp connection, are possible materials for the hinge.

The clamp connection is produced from metal and bent into the desired shape, produced from plastic by an injection molding method or shaped from a plastic strip by heat action.

Preferably, one or more clamp connections are fixed in the recesses of the hinge parts. The recesses in the hinge parts may be formed in this case as described above. For fastening the clamp connection, it is clamped over the two hinge parts, so that the ends of the clamp connection engage in the recesses.

The invention will be described in more detail below on the basis of figures. Taken individually, FIG. 1 a-d show three-dimensional representations of the eyeglass hinge according to the invention from different viewing angles, FIGS. 2a and b show three-dimensional representations of a second embodiment of the eyeglass hinge according to the invention.

FIGS. 1a to 1d show three-dimensional representations of an eyeglass hinge 1 according to the invention from various viewing angles. Eyeglass hinge 1 in this embodiment is composed of two hinge parts 2 and 2a and a clamp connection 3. One of the two hinge parts 2 has a curvature 4 and the other hinge part 2a has a dome-shaped cap 5. In this case, the curvature 4 of first hinge part 2 is disposed in dome-shaped cap 5 of the second hinge part 2a, so that the two hinge parts 2 and 2a together form a ball joint, which is held together in an articulated manner by clamp connection 3.

The hinge parts 2 and 2a have a device 6, by means of which they can be connected to a lens mounting rim or an earpiece. In this case, device 6 is inserted into a borehole or a recess of an earpiece or a lens mounting rim, respectively, and optionally is glued therein. In the embodiment of eyeglass hinge 1 according to the invention, which is shown in FIGS. 1a to 1d, hinge parts 2, 2a have a pin 7, which increases the stability of the connection between eyeglass hinge 1 and the lens mounting rim or earpiece.

Figure 1A:
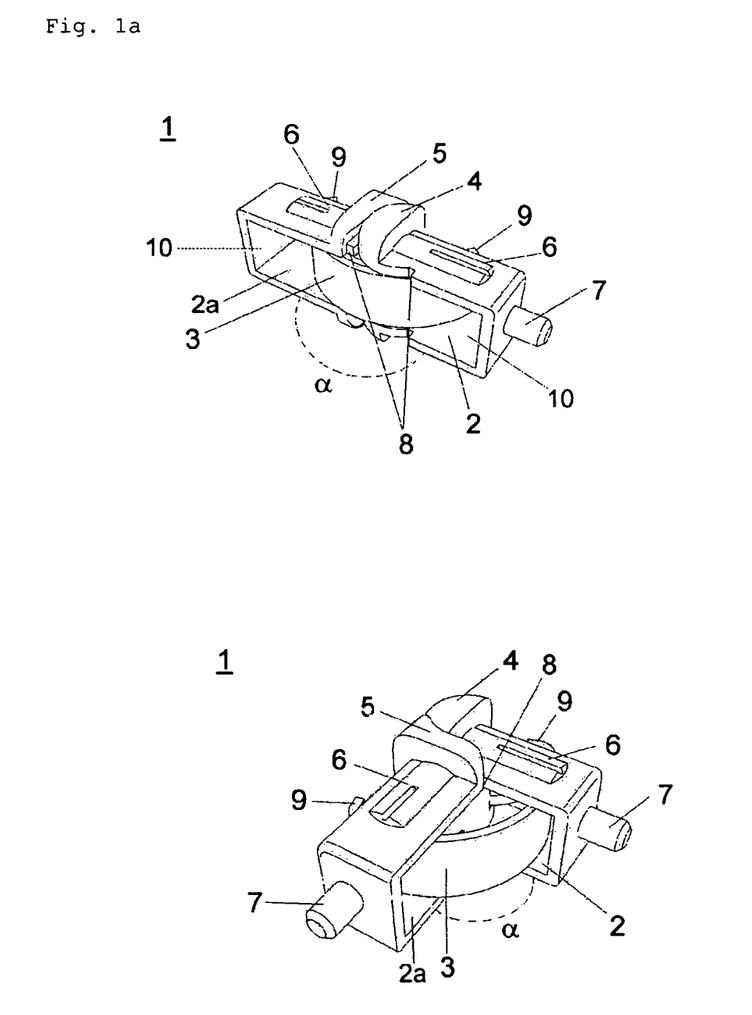

FIGS. 1a, 1b and c show eyeglass hinge 1 according to the invention from the side that is facing the head of the person who is wearing eyeglasses with such an eyeglass hinge 1. FIG. 1d shows the side of eyeglass hinge 1 that is turned away from the head of the person wearing the eyeglasses.

Figure 1C:
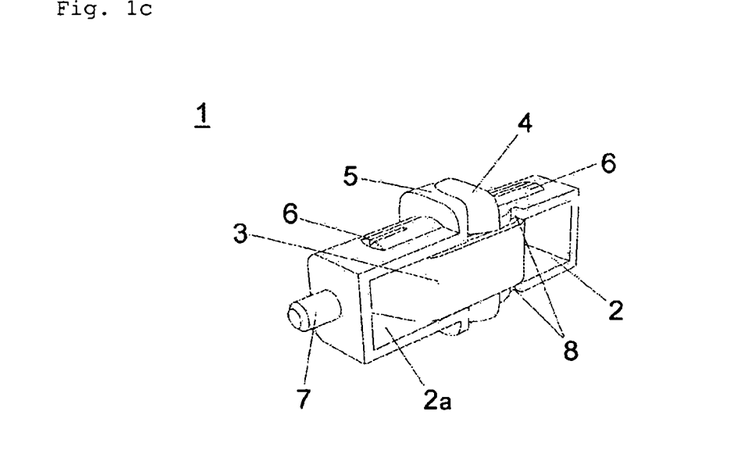
Figure 1D:
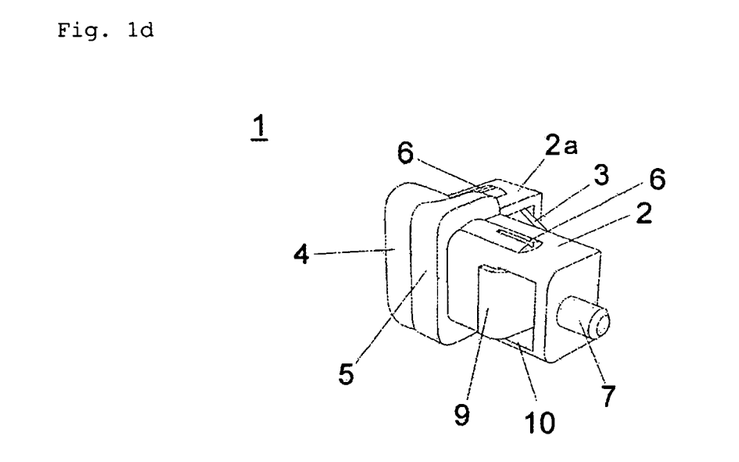

FIGS. 1a and 1c show eyeglass hinge 1 in a position with a frame opening angle $\alpha_{open}$ of 180°. The construction of eyeglass hinge 1 according to the invention makes it possible for eyeglass hinge 1 to extend beyond frame opening angle $\alpha_{open}$ without problem, so that frame opening angle $\alpha$ is greater than 180° ($\alpha_{max}$).

FIGS. 1b and 1d show eyeglass hinge 1 in a position with a frame opening angle $\alpha_{closed}$ of approximately 90°. This position approximately corresponds to the position of a folded closed earpiece.

In order to limit the movement of eyeglass hinge 1, both hinge parts 2 and 2a have a stop piece 8. This stop piece 8 limits the folding of eyeglass hinge 1 to between a frame opening angle α of 90° and a frame opening angle α of 180°. This corresponds to an eyeglass hinge with a folded closed or opened earpiece, respectively.

Ends 9 of clamp connection 3 are bent pointing toward one another and serve for fixing clamp connection 3. As is shown in FIG. 1d, each one of the two bent ends 9 of clamp connection 3 engages in a recess 10 of a hinge part 2, 2a.

Figure 2A:
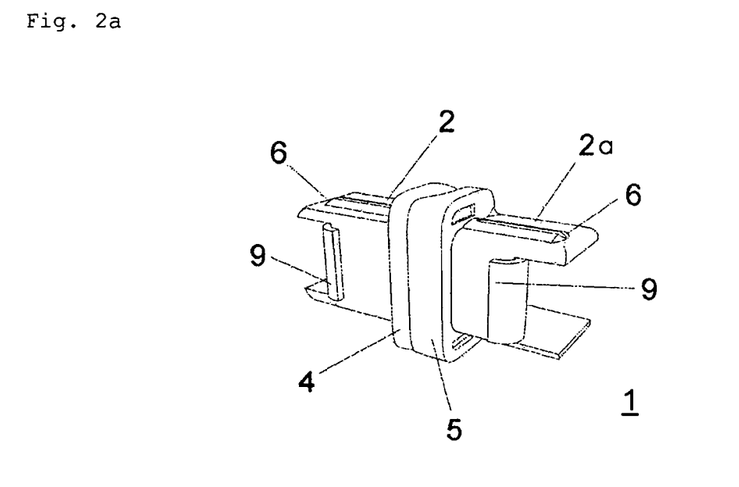
Figure 2B:
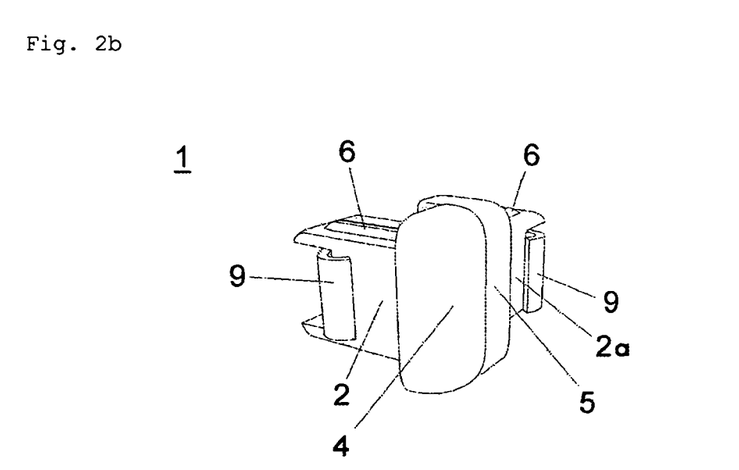

FIGS. 2a and 2b show another embodiment of eyeglass hinge 1. In this embodiment, eyeglass hinge 1 does not comprise a pin 7.

Figure 3:
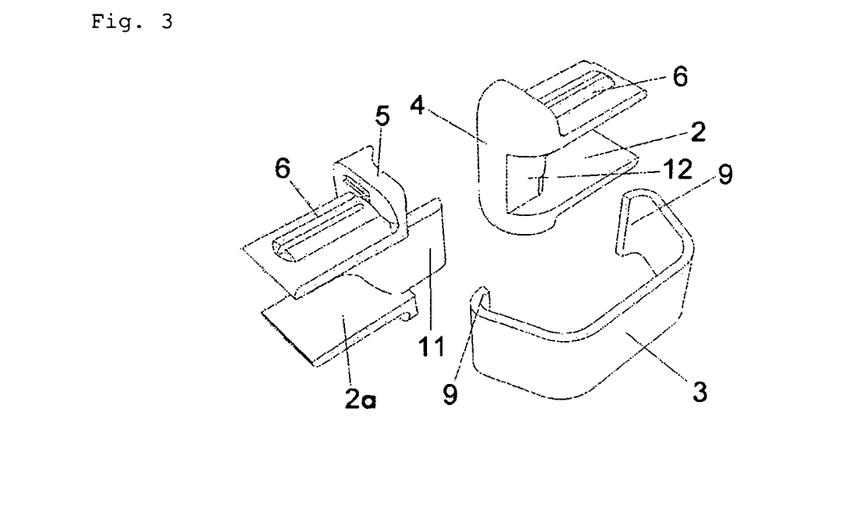
FIG. 3 shows an exploded representation of the second embodiment of the eyeglass hinge according to the invention, FIGS. 4a and b show three-dimensional representations of a third embodiment of the eyeglass hinge according to the invention, FIGS. 5a and b show three-dimensional representations of a fourth embodiment of the eyeglass hinge according to the invention, FIGS. 6a and b show three-dimensional representations of a fifth embodiment of the eyeglass hinge according to the invention, FIGS. 7a and b show three-dimensional representations of a sixth embodiment of the eyeglass hinge according to the invention, FIGS. 8a and b show three-dimensional representations of a seventh embodiment of the eyeglass hinge according to the invention, FIGS. 9a and b show three-dimensional representations of an eighth embodiment of the eyeglass hinge according to the invention.

FIG. 3 shows an exploded diagram of the embodiment of eyeglass hinge 1 which is shown in FIGS. 2a and 2b and is composed of two hinge parts 2 and 2a and a clamp connection 3.

Crosspiece 11 on hinge 1 is responsible for the correct position in the open state. It is set on a support surface 12 and thus prevents a further opening.

With a greater force action, however, the hinge can be opened further. The convex hinge part 2a then leaves the surface support in concave hinge part 2 and rotates somewhat further until the clamp is found on crosspiece 11. The clamp finally limits any further opening and the hinge cannot be opened further without breaking it.

Figure 4A:
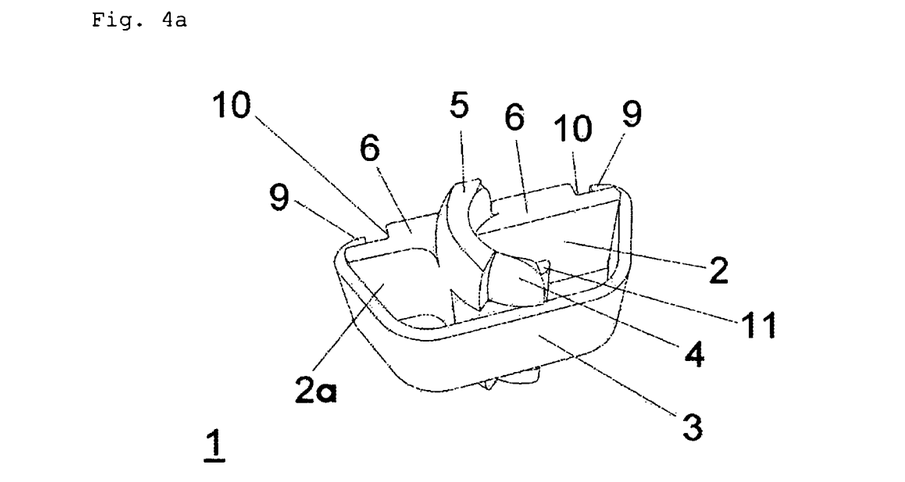
Figure 4B:
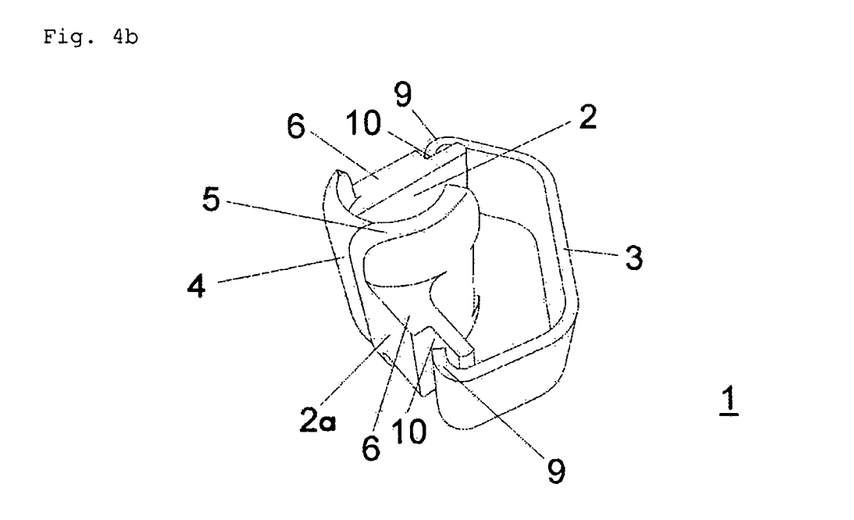

FIGS. 4a and 4b show another embodiment of eyeglass hinge 1, in which ends 9 of clamp connection 3 engage around device 6. In this case, recess 10 is shaped in the form of a shoulder, which is formed due to a reduction of the material thickness in this region.

Figure 5A:
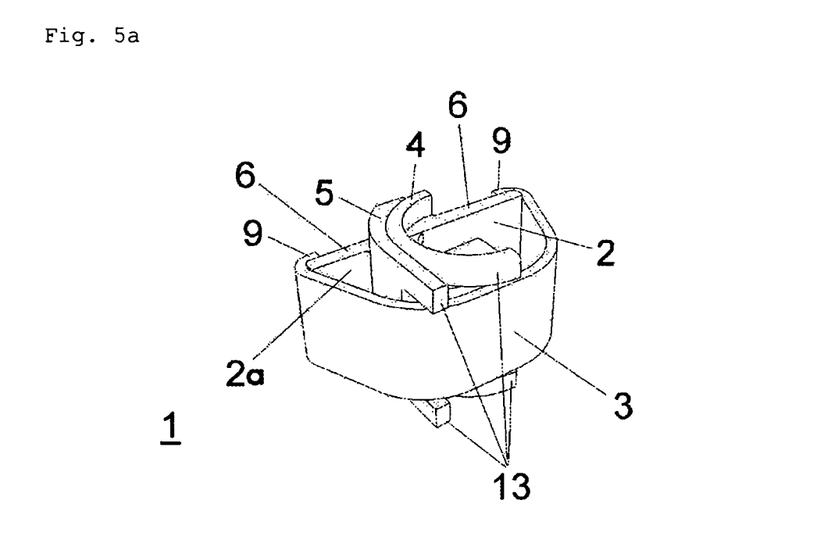
Figure 5B:
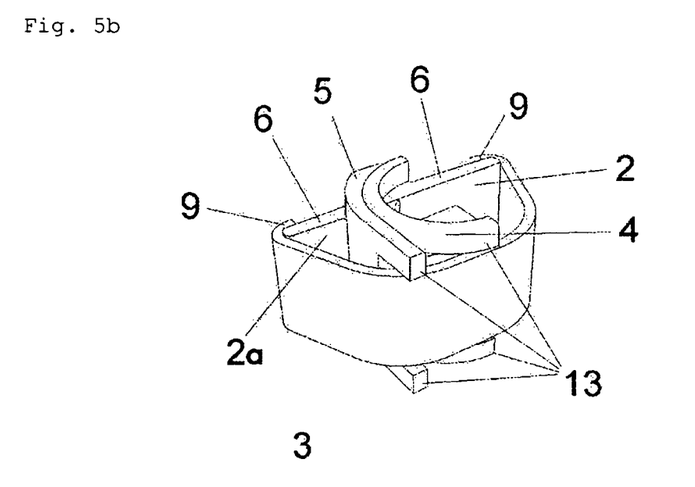

FIGS. 5a and 5b show another embodiment of eyeglass hinge 1. In this embodiment, the dome-shaped cap 5 and curvature 4 have guide rails 13, which prevent clamp connection 3 from being pulled out. Also, guide rails 13 can serve for fastening an earpiece or the lens mounting rim.

Figure 6A:
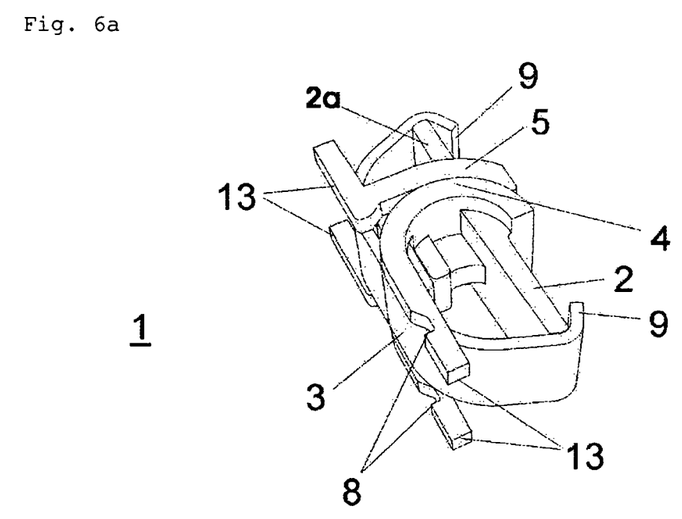
Figure 6B:
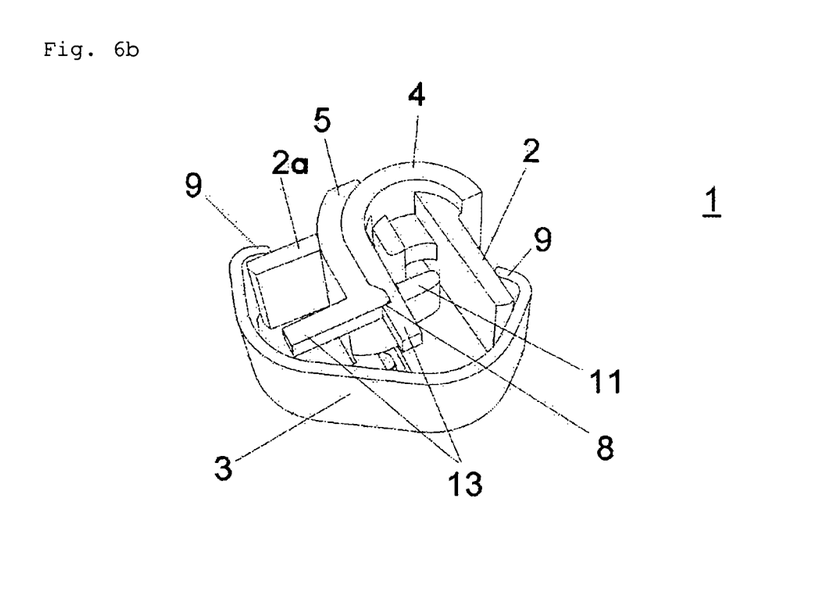

FIGS. 6a and 6b show another embodiment of eyeglass hinge 1, which essentially corresponds to the embodiment shown in FIGS. 5a and 5b, but deviating from it in that it has another configuration of guide rails 13. Here, guide rails 13 have a stop notch 8, which limits the movement of eyeglass hinge 1.

Figure 7A:
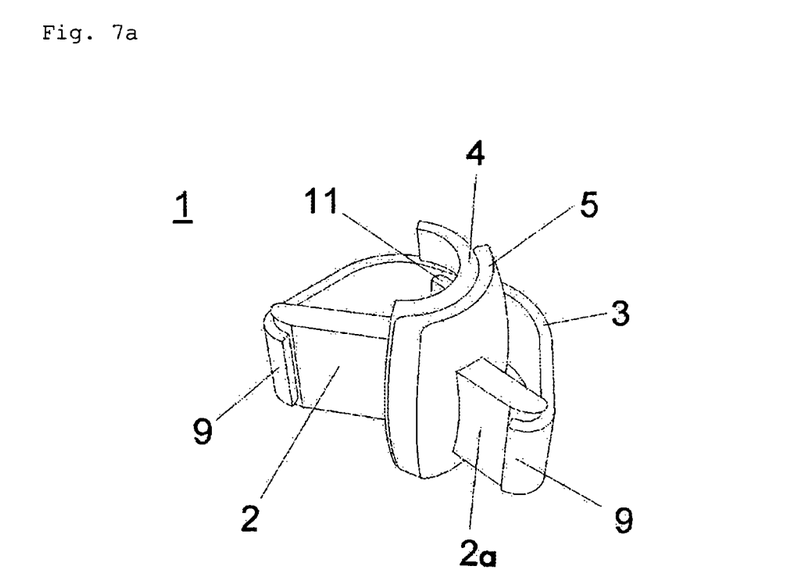
Figure 7B:
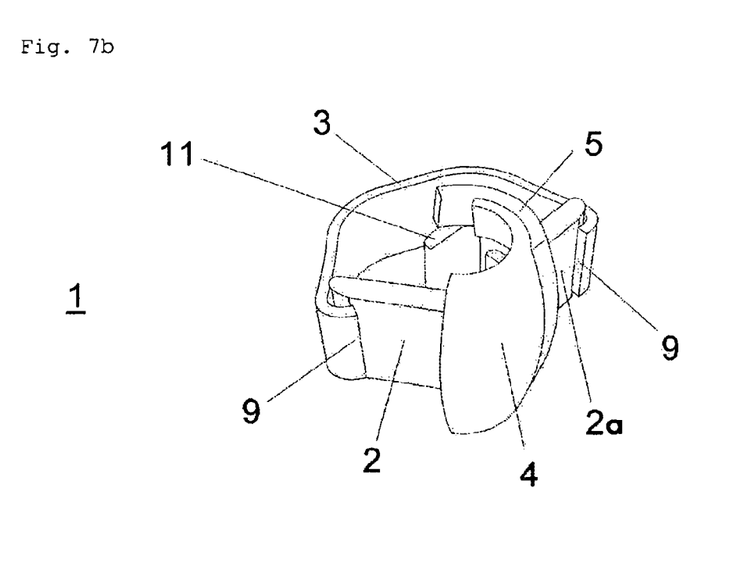

The embodiment of eyeglass hinge 1 shown in FIGS. 7a and 7b differs from the embodiment shown in FIGS. 4a and 4b in that hinge parts 2 and 2a are flattened at their ends. Ends 9 of clamp connection 3 engage around these flattened ends.

Figure 8A:
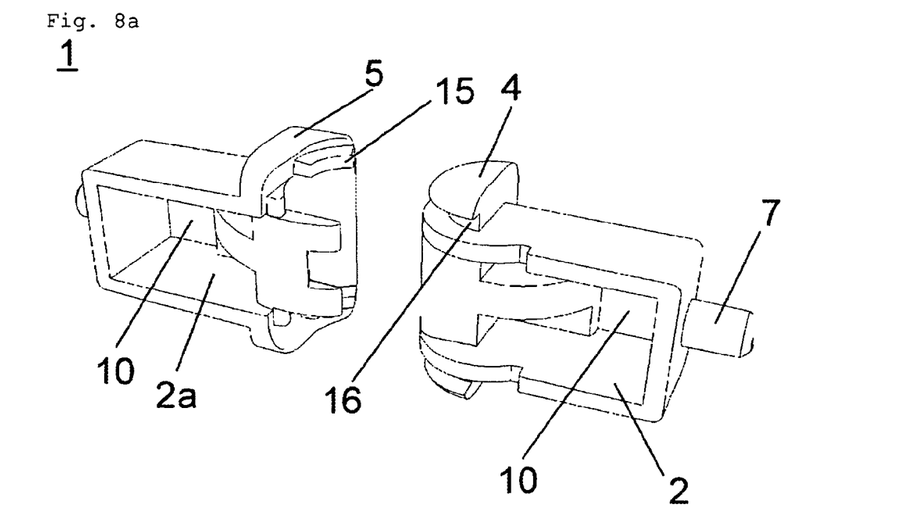
Figure 8B:
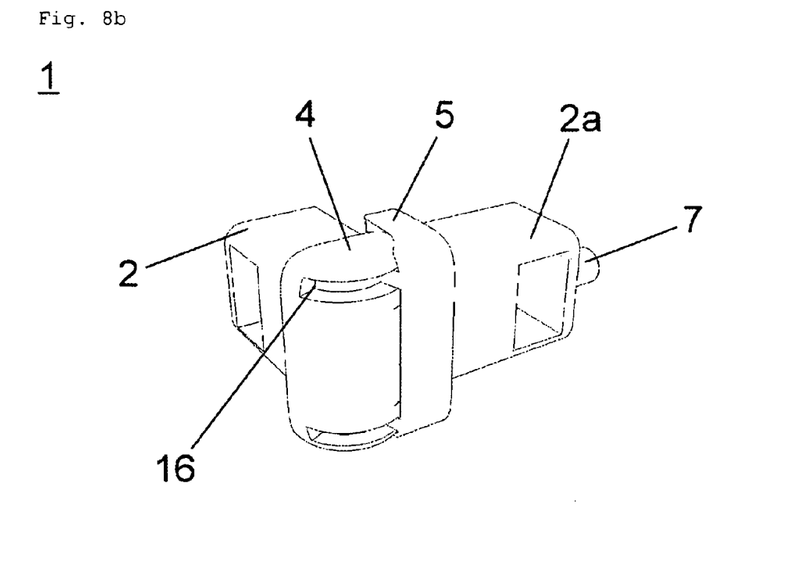

In the embodiment of the eyeglass hinge shown in FIGS. 8a and 8b, part 2a of the eyeglass hinge has a positively shaped block 15, which is disposed on the side of dome-shaped part 5 that points toward hinge part 2. Hinge part 2 has a rail-shaped region 16, which is disposed and shaped so that it can receive the shaped block 15. Whereby the positively shaped block 15 and rail 16 are found in the upper region of hinge parts 2a and 2 in the embodiment shown in FIGS. 8a and 8b.

Figure 9A:
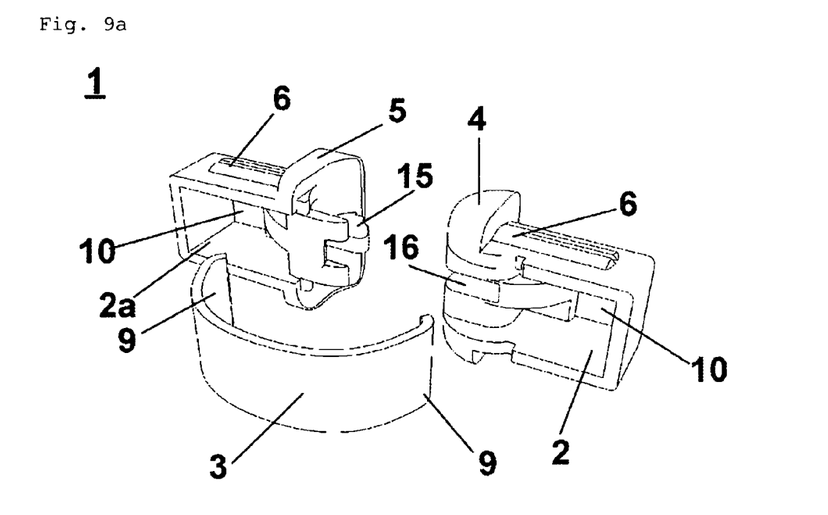
Figure 9B:
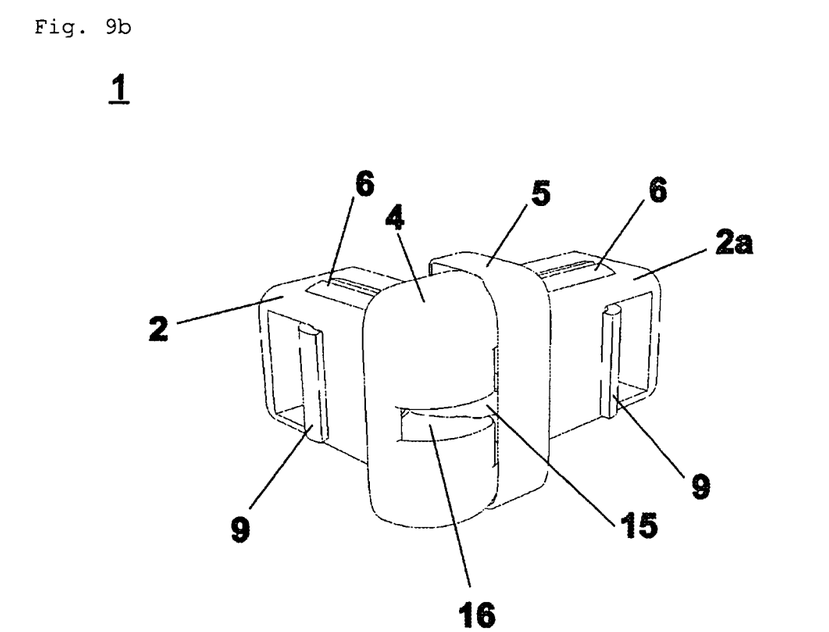

The embodiment of eyeglass hinge 1 shown in FIGS. 9a and 9b also has a positively shaped block 15 on hinge part 2a, and a rail-shaped region 16 is formed opposite this block on hinge part 2. Differing from the embodiment shown in FIGS. 8a and 8b, block 15 is formed approximately in the center in the dome-shaped part and rail 16 is formed approximately in the center in the dome-shaped part of hinge part 2a*.

*sic; rail 16 is formed approximately in the center of hinge part 2?—Translator's note.

Figure 10A:
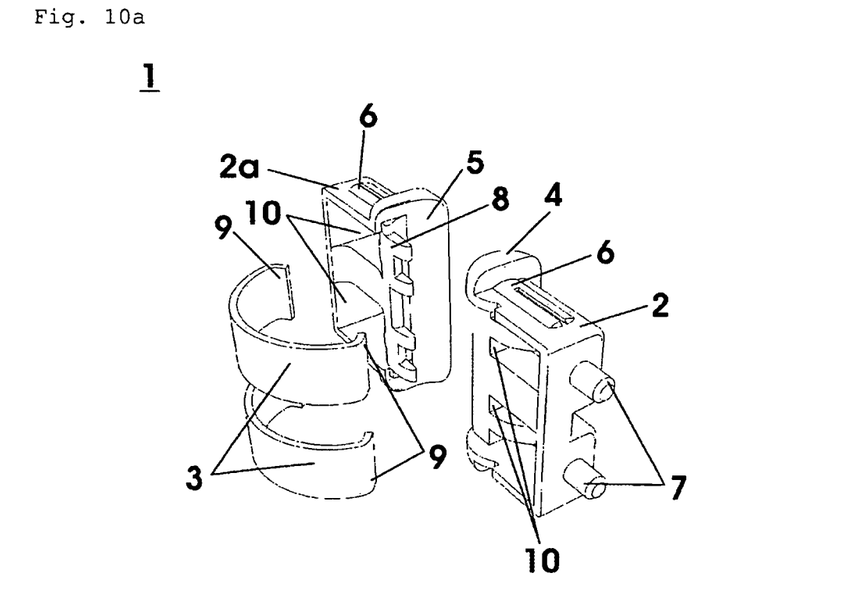
FIG. 10a shows an exploded representation of a ninth embodiment of the eyeglass hinge according to the invention, and FIGS. 10b and c show three-dimensional representations of the ninth embodiment of the eyeglass hinge according to the invention.
Figure 10B:
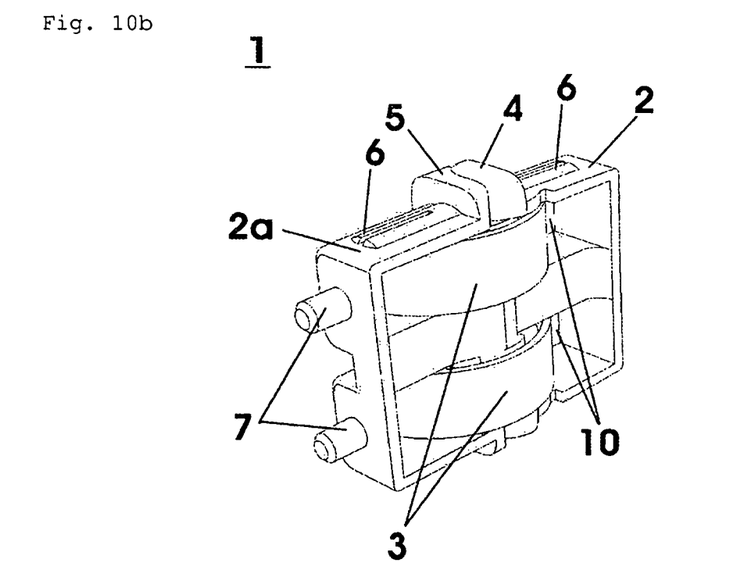
Figure 10C:
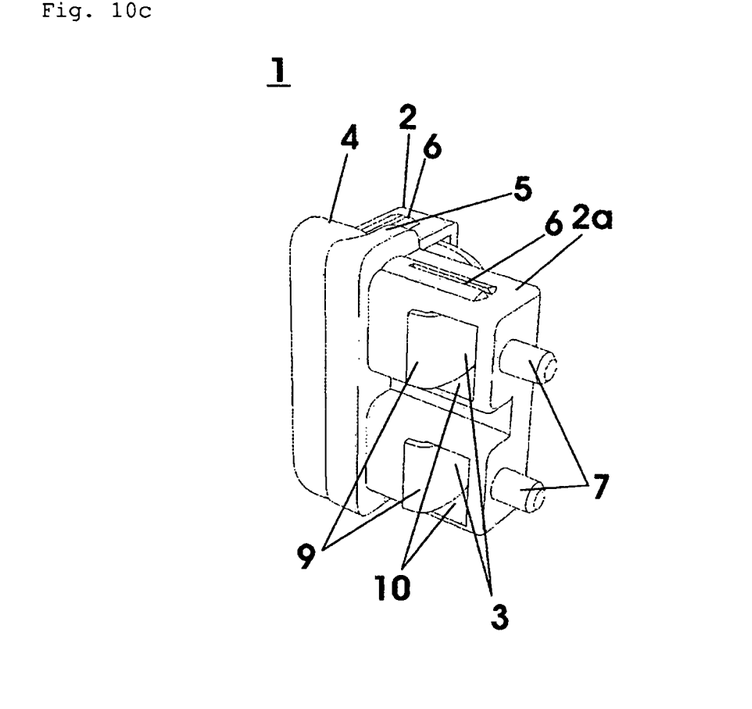

FIGS. 10a, 10b and 10c show an embodiment of the eyeglass hinge according to the invention in which the hinge comprises two clamp connections 3. Each of hinge parts 2, 2a have two recesses 10, in which clamp connections 3 engage by their bent ends 9. In addition, each of hinge parts 2, 2a comprises two pins 7. In the embodiment shown, the eyeglass hinge comprises a stop piece 8. Additional features of this embodiment correspond to the features of the embodiment shown in FIGS. 1a to 1d.

The embodiments of eyeglass hinge 1 shown in FIGS. 1 to 10 are suitable for the purpose of being incorporated in the form of an inlay (an inlay) as a connection between the lens mounting rim and the earpiece.

LIST OF REFERENCE NUMBERS

1 Eyeglass hinge
2, 2a Hinge parts
3 Clamp connection
4 Curvature
5 Dome-shaped cap
6 Device for fastening the hinge part
7 Pin
8 Stop piece
9 Bent end of the clamp connection
10 Recess
11 Crosspiece
12 Guide channel
13 Guide rails
14 Profile
15 Shaped block
16 Rail

The invention claimed is:

1. An eyeglass hinge composed of two hinge parts and at least one clamp connection, wherein the at least one clamp connection holds the two hinge parts together in an articulated manner,
  characterized in that one hinge part has a curvature and the other hinge part has a dome-shaped cap, whereby curvature of the one hinge part is disposed in the dome-shaped cap of the other hinge part.

2. The eyeglass hinge according to claim 1, further characterized in that each hinge part has at least one recess, in which the at least one clamp connection can be fixed.

3. The eyeglass hinge according to claim 1, further characterized in that the clamp connection is a bent, elongated material strip, whose ends are bent pointing toward one another.

4. The eyeglass hinge according to claim 3, further characterized in that each of the bent ends of the clamp connection is engaged in a recess of the hinge parts.

5. The eyeglass hinge according to claim 1, further characterized in that when frame opening angle α changes, the eyeglass hinge independently either
  jumps from a position with an open frame opening angle $α_{open}$ to a position with a closed frame opening angle $α_{closed}$ or
  jumps from a position with a closed frame opening angle $α_{closed}$ to a position with an open frame opening angle $α_{open}$.

6. The eyeglass hinge according to claim 1, further characterized in that at least one of the two hinge parts has a stop piece that limits a frame opening angle when the eyeglass hinge is bent at an angle.

7. The eyeglass hinge according to claim 1, further characterized in that one hinge part has at least one block-like raised material piece and the other hinge part has a rail that is shaped and dimensioned so that it can receive the at least one block-like raised material piece.

8. The eyeglass hinge according to claim 1, further characterized in that the hinge parts have devices for fastening to an earpiece or to a lens mounting rim.

9. The eyeglass hinge according to claim 1, further characterized in that the hinge parts have at least one pin, at least one anchor piece and/or at least one textured adhesive surface, which can be fixed in an earpiece or in a lens mounting rim.

10. The eyeglass hinge according to 1, further characterized in that one end of one of the two hinge parts has an extension in the form of an earpiece and/or the free end of the other hinge part has an extension in the form of a lens mounting rim.

11. An eyeglass frame composed of two eyeglass hinges according to claim 1, two earpieces and one lens mounting rim is hereby characterized in that eyeglass hinges are joined to the lens mounting rim on one side of the hinge and each hinge is joined to an earpiece on the other side of the hinge.

12. The eyeglass frame comprising at least one eyeglass hinge according to claim 1.

13. Use of an eyeglass hinge according to claim 1 for producing an eyeglass frame.

14. An eyeglass hinge composed of two hinge parts and at least one clamp connection, wherein the at least one clamp connection holds the two hinge parts together in an articulated manner, characterized in that when frame opening angle $\alpha$ changes, the eyeglass hinge independently either jumps from a position with an open frame opening angle $\alpha_{open}$ to a position with a closed frame opening angle $\alpha_{closed}$ or jumps from a position with a closed frame opening angle $\alpha_{closed}$ to a position with an open frame opening angle $\alpha_{open}$, further characterized in that the open frame opening angle $\alpha_{open}$ corresponds to an angle of approximately 180° and the closed frame opening angle $\alpha_{closed}$ corresponds to an angle of approximately 90°.

15. An eyeglass hinge composed of two hinge parts and at least one clamp connection, wherein the at least one clamp connection holds the two hinge parts together in an articulated manner, characterized in that frame opening angle $\alpha_{open}$ can assume a value of approximately 180° up to approximately 186° without problem and that frame opening angle $\alpha_{closed}$ can assume a value of approximately 90° down to approximately 85° without problem.

* * * * *